United States Patent
Otaki et al.

(10) Patent No.: US 6,862,901 B1
(45) Date of Patent: Mar. 8, 2005

(54) PROCESS AND APPARATUS FOR PRODUCING GLASS FIBERS

(75) Inventors: Keiji Otaki, Koriyama (JP); Yukiyoshi Shinobu, Koriyama (JP); Yoshiyuki Harada, Koriyama (JP)

(73) Assignees: Paramount Glass Manufacturing Co., Ltd., Koriyama (JP); NTB Technology Co., Ltd., Koriyama (JP)

( * ) Notice: Subject to any disclaimer, the term of this patent is extended or adjusted under 35 U.S.C. 154(b) by 457 days.

(21) Appl. No.: 09/831,736
(22) PCT Filed: Sep. 14, 2000
(86) PCT No.: PCT/JP00/06315
  § 371 (c)(1),
  (2), (4) Date: May 14, 2001
(87) PCT Pub. No.: WO01/19741
  PCT Pub. Date: Mar. 22, 2001

(30) Foreign Application Priority Data

Sep. 16, 1999 (JP) .......................... 11-261856

(51) Int. Cl.⁷ ...................... C03B 37/04; C03B 37/083; C03B 37/16
(52) U.S. Cl. ............... 65/455; 65/457; 65/459; 65/460; 65/462; 65/463; 65/467; 65/522; 65/524; 65/525; 65/527; 425/8; 264/8
(58) Field of Search .................. 65/437, 438, 454–463, 65/469, 470, 492, 504, 515–518, 520–523, 525, 433, 480, 174, 334, 467, 527; 425/7, 8; 264/8; 83/13–18, 22

(56) References Cited

U.S. PATENT DOCUMENTS 3,026,563 A * 3/1962 Slayter et al. ............... 65/521
3,304,164 A    2/1967 Charpentier et al.
3,523,774 A    8/1970 Kleist
3,785,791 A * 1/1974 Perry .......................... 65/488
4,636,234 A * 1/1987 Huey et al. .................. 65/437
4,689,061 A * 8/1987 Britts et al. .................. 65/460
5,326,241 A * 7/1994 Rook et al. ................... 425/7
5,514,199 A * 5/1996 Houpt ......................... 65/502
6,596,048 B1 * 7/2003 Tuffal et al. ................. 55/527

FOREIGN PATENT DOCUMENTS

JP    B1 42-13748    8/1967

* cited by examiner

Primary Examiner—Peter Chin
Assistant Examiner—Eric Hug
(74) Attorney, Agent, or Firm—Oliff & Berridge, PLC

(57) ABSTRACT

A process and an apparatus for producing glass fibers by centrifugal force are provided. Molten glass is fed into a hollow cylinder of rotating member which rotates at high speed by means of a driving device and is heated. The molten glass is ejected to an outside of a peripheral wall by centrifugal force generated by high speed rotation of the rotating member through orifices, each of which has different diameter, and which are provided alternately in a circumferential direction of the peripheral wall. A primary steam of molten glass is ejected. The primary streams is introduced into flame flow ejecting from drawing burners located at outside of the peripheral wall to form secondary fibers. A compressed gas flow is ejected to a direction at an acute angle through an ejecting outlet of an ejecting nozzle to collide the compressed fluid with the secondary fibers to thereby produce glass fibers by continuously.

9 Claims, 4 Drawing Sheets

(a)

(b)

PROCESS AND APPARATUS FOR PRODUCING GLASS FIBERS

FIELD OF INVENTION

The present invention relates to a process and an apparatus for producing glass fibers by utilizing centrifugal force, which can improve the production efficiency, can lower the fuel consumption by drawing burners, and can continuously spin glass fibers capable of complying with quality requirements for glass fiber products by using a simple means for production.

PRIOR ART

A process and an apparatus for producing glass fibers by centrifugal force have been disclosed in JP-B-42-13748 and U.S. Pat. No. 4,689,061. JP-B-42-13748 discloses that a rotating member has a peripheral wall which is provided with orifices in a longitudinal direction. The diameter of orifices becomes smaller in a direction from the upper side to the bottom side, in order to solve disadvantage that glass fibers with good quality cannot be produced due to collision of fibers in the upper side and fibers in the lowerside when applying wind flow to fine strings of a material ejected through the orifices by centrifugal force.

Whereas, the apparatus disclosed in U.S. Pat. No. 4,689,061 is constituted by arranging in plurality of rows of orifices, where orifices in 2 or more rows are provided by perforation in a vertical direction, in the peripheral wall of a rotating member, providing no-orifice part at the middle part between the orifices in rows, and arranging the orifices of which diameter in the upper side being smaller than the diameter of the orifices in the lower side.

However, according to the processes as disclosed in the above former prior art, it is not possible to obtain glass fibers with good quality, because the collision of fibers cannot be prevented during the process of drawing of fine strings of a material ejected through the orifices to fine fibers, if orifices in 40 rows more or less are arranged in a vertical direction in order to improve the production efficiency per a rotating member. Furthermore, as various types of glass fibers are required, such as low density product required for having restoring property against compression and medium-high density product required for having hardness, there is a limit for such process in the production of glass fibers complying with each requirements for the quality, such as fiber diameter, fiber diameter distribution and fiber length.

The process disclosed in the later patent is constituted by providing the non-orifice part in the middle between the orifices in rows. Therefore, if the number of the orifices are increased for improving the production capacity per a rotating member, it is required to increase the height of the peripheral wall of the rotating member to oversize, thus increasing fuel consumption by burners required for producing fine fibers to raise the production cost and causing more collision of the fibers, which thereby makes difficult to obtain glass fibers with good quality.

SUMMARY OF INVENTION

Considering the prior arts as described above, it is an object of the present invention to provide a process and an apparatus for producing glass fibers with good quality that complies with requirements for various glass fiber products in terms of fiber diameter, fiber diameter distribution, fiber length, etc., characterized by increasing the number of orifice rows provided by perforation in the peripheral wall of the rotating member and arranged in a vertical direction to increase the production capacity per a rotating member, and allowing to provide advantages of reducing fuel consumption by burners used for drawing the ejected streams to minimize the production cost.

According to the present invention, it is provided a process for producing glass fiber comprising heating and rotating a hollow cylinder-shaped rotating member having peripheral wall provided with orifices so as to rotate molten glass in the rotating member, and ejecting the molten glass through orifices by centrifugal force to form glass fiber, characterized in ejecting molten glass through at least two types of orifices arranged alternately in a circumferential direction of the rotating member, each of said two types of orifices having different diameter, so as to form at least two types of primary streams having different length; introducing said primary streams into flame flow around the rotating member, said flame flow being ejected in a direction substantially parallel with a generatrix direction of an outer circumference of the peripheral wall, so as to fine said primary streams to form secondary fibers; and ejecting compressed fluid in a direction at an acute angle relative to the flame flow including secondary fibers, to collide the secondary fibers with the compressed fluid.

Preferably, the compressed fluid is ejected in an angle of 15–30 degree relative to the generatrix direction of the outer circumference of the peripheral wall of the rotating member.

Preferably, a distance between a top edge of the compressed fluid and a a bottom edge of the peripheral wall of the rotating member is at least 30 mm.

Also, according to the present invention, it is provided an apparatus for producing glass fiber comprising a hollow cylinder-shaped rotating member having a peripheral wall alternately provided with at least two types of orifices each having different diameter in a circumferential direction of the peripheral wall; a circular drawing burner concentrically arranged above and around the rotating member, and having an ejecting outlet opened in substantially parallel with a generatrix direction of an outer circumference of the peripheral wall; and an ejecting nozzle around the drawing burner, said ejecting nozzle being concentrically arranged above and around the peripheral wall of the rotating member, and having an ejecting outlet opened in a direction at an acute angle relative to the generatrix direction of the outer circumference of the peripheral wall.

Preferably, at least two types of orifices each having different diameter are alternately provided in the peripheral wall in the circumferential direction of the peripheral wall, to form a latitudinal row; a plurality of longitudinal orifice rows are provide in the peripheral wall in the generatrix direction of the outer circumference of the peripheral wall; and the orifice in a lowerside region has a diameter smaller than that of the corresponding orifice in an upper side region.

Preferably, the peripheral wall is provided with larger orifices and smaller orifices; the larger orifices are arranged in the generatrix direction of the outer circumference to form first bands group of orifices; the smaller orifices are arranged in the generatrix direction of the outer circumference to form second bands group of orifices; and the first bands group of orifices and the second bands group of orifices are arranged alternately in the circumferential direction of the peripheral wall (2) of the rotating member.

Preferably, the orifice arranged in a lowerside region has a diameter smaller than that of the orifice arranged in an upper side region in either the first bands group of orifices or the second bands group of orifices.

Preferably, a difference in the diameter between at least two types of orifices each having different diameter is in a range of from 0.02 to 0.3 mm.

BRIEF EXPLANATION FOR DRAWINGS

PREFERABLE EMBODIMENT FOR CARRYING OUT THE INVENTION

Figure 1:
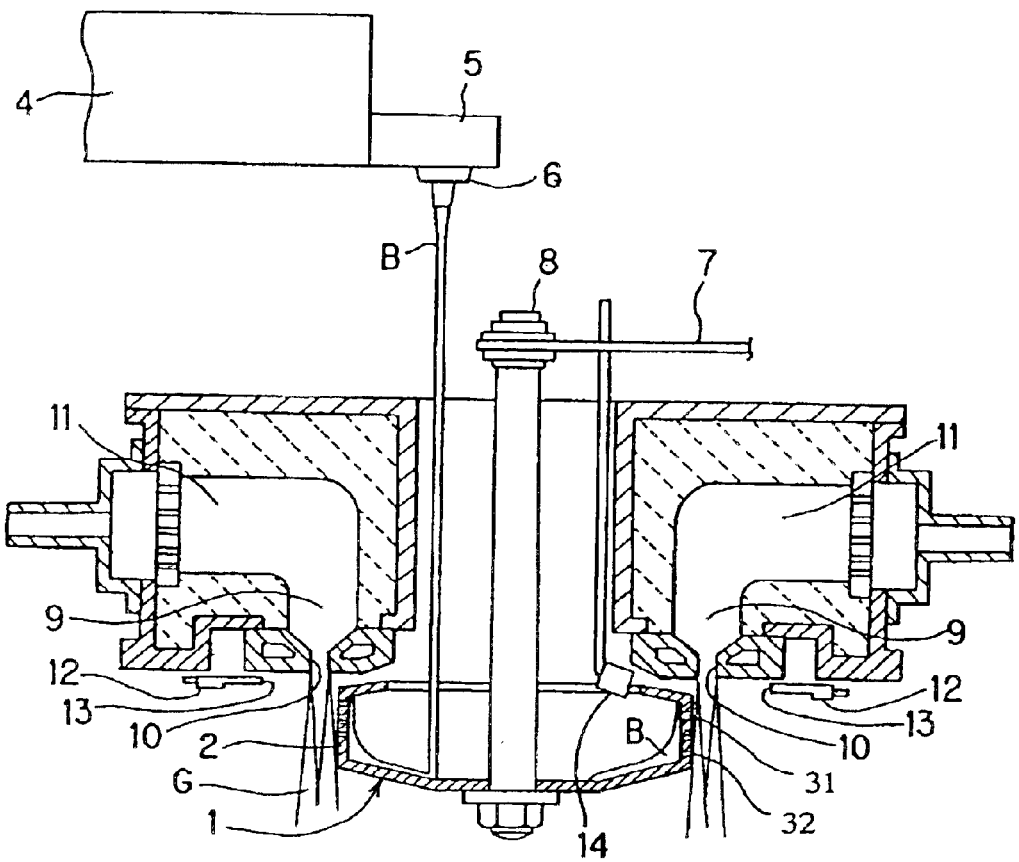
FIG. 1 is a cross section showing main parts of an apparatus according to the present invention.
Figure 2:
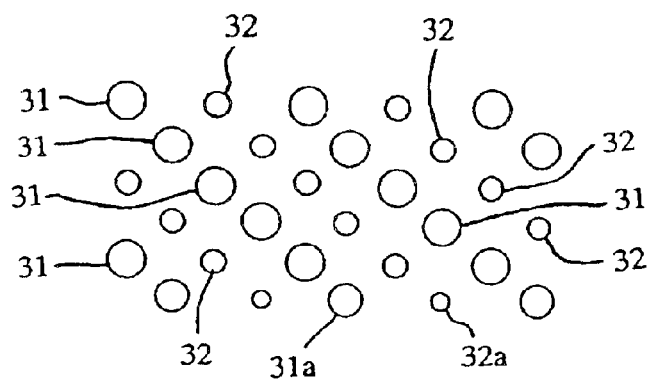
FIG. 2 is an example for an arrangement of orifices.

FIG. 1 and FIG. 2 show an example for an apparatus according to the present invention. The apparatus for producing glass fibers according to the present invention comprises a hollow cylinder-shaped rotating member 1, a drawing burner 9 circumferentially arranged above the rotating member 1, and ejecting nozzles 12. In the apparatus shown in FIG. 1, a glass melting furnace 4 and a forehearth 5 are arranged above the rotating member 1. The forehearth 5 is provided with an ejecting nozzle 6 on a lower surface thereof. Molten glass is fed through the ejecting nozzle 6 to an inside of the hollow cylinder of the rotating member 1.

The rotating member 1 has a peripheral wall 2 which is provided with a plurality of orifices. FIG. 2 shows an example of an arrangement of the orifices provided by perforation in the peripheral wall 2 of the rotating member 1. In a circumferential direction of the peripheral wall 2, the peripheral wall is provided with latitudinal rows of orifices. Each of the latitudinal rows comprises larger orifices (orifices with a larger diameter) 31 and smaller orifices (orifices with a smaller diameter) 32 which are arranged alternately with a certain interval. In a generatrix be direction of the peripheral wall, the peripheral wall is provided with longitudinal a rows of orifices. A larger orifice 31 in one of the latitudinal rows is arranged between the larger orifice 31 and the smaller orifice 32 in the adjacent of the latitudinal row. Each of large orifices 31a in latitudinal rows arranged on an lowerside has a smaller diameter than that of larger orifices 31 in latitudinal rows arranged on an upper side. In the illustrated example shown in FIGS. 1 and 2, each of the latitudinal rows comprises two types of orifices having different diameter, however, such row may be comprises 3 or more types of orifices having different diameter.

A driving device (not shown) for rotating the rotating member 1 rotates a belt 7, and the belt 7 is connected with a rotating shaft 8, so as to rotate the rotating member 1 connected to the shaft 8 at high speed. The drawing burner 9 is concentrically and circumferentially arranged above the rotating member 1. The drawing burner 9 has an ejecting outlet 10 and a combustion room 11. The outlet 10 opens downwardly in substantially parallel with an outer circumference of the peripheral wall 2, and flame flow G of burned exhaust gas in the combustion room 11 ejects from the drawing burner 9 along with the generatrix direction of the peripheral wall 2.

Ejecting nozzles 12 for the compressed fluid are arranged concentrically with an outer circumference of the rotating member 1, below the combustion room 11, and around the ejecting outlet 10 of the drawing burner 9. Each of the ejecting nozzles 12 is provided with an ejecting outlet 13 which is opened in a direction at an acute angle relative to the generatrix direction of outer circumference of the rotating member 1. In prior arts, such ejecting nozzle 12 has not been employed. The numeral 14 in FIG. 1 indicates a burner for heating an inside of the rotating member 1.

The rotating member 1 rotates at high speed by the driving device, the inside of the rotating member 1 is heated by the burner 14, and the molten glass B is fed through the ejecting nozzle 6 into the inside of the hollow cylinder of the rotating member 1. The molten glass B is ejected out though the ejecting nozzle 6 of the forehearth 5 in a tapered cylindrical form, then is fed into the inside of the rotating member 1 in linear state.

The molten glass B fed into the inside of the rotating member 1 is raised upwardly onto an internal surface of the peripheral wall 2 by a centrifugal force generated by rotation of the rotating member 1 at high speed, and is ejected through a plurality of larger orifices 31 (31a) and smaller orifices 32 (32a) of the peripheral wall 2, to form a larger primary stream having larger diameter obtained through the larger orifices 31 (31a) and a smaller primary stream having smaller diameter obtained through the smaller orifices 32 (32a). The larger primary stream has greater mass, while the smaller primary stream has less mass. Consequently, when equivalent kinetic energy (namely the centrifugal force generated by the rotating member 1) is applied, the larger primary streams 311 are spread in longer distance than the distance for the shorter primary streams 312 (See FIG. 4). Thus, a length of the primary stream ejected through the larger orifices 31 (31a) is longer than that of the primary stream ejected through the smaller orifices 32 or 32a.

Figure 4:
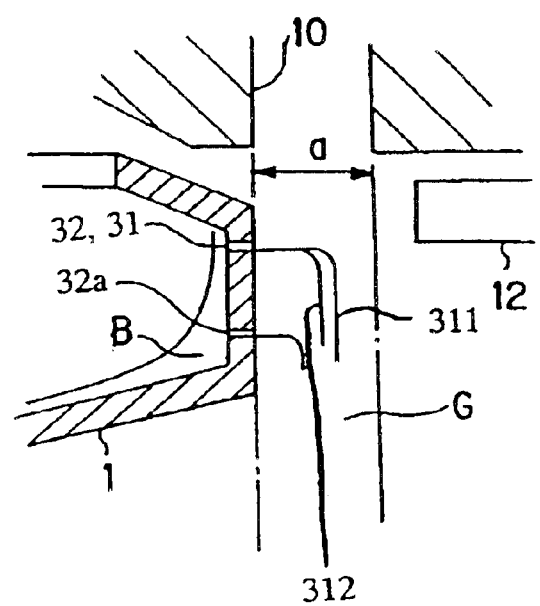
FIG. 4 is a schematic diagram showing a process to introduce primary streams into flame flow.

The process and the apparatus according to the present invention are constituted as described above, at least two types of orifices each having two different diameter are alternately provided in one latitudinal row circumferentially extending in peripheral wall 2 of the rotating member 1. In other word, a larger orifice 31 is adjacent to two smaller orifices 32, and a smaller orifice 32 is adjacent to two larger orifices 31. The primary stream formed by the ejection through an orifice 31 (or 32) by the centrifugal force of the rotating member 1 has a different length from the length of another primary stream formed by the ejection through the adjacent orifice 32 (or 31), and these adjacent primary streams, each of those which has a different length, are introduced into flame flow fed from the drawing burner. Therefore, as shown in FIG. 4, there is no opportunity for the adjacent primary streams 311 and 312 to be knotted or clashed, and these streams can efficiently receive heat and drawing load given by the flame flow.

Each of the orifices 31a and 32a in a latitudinal row positioning at the lowerside of the generatrix direction of the outer circumference respectively has a a diameter smaller than that of the corresponding orifices 31 and 32 in a latitudinal row at the upper side of the generatrix direction. Thus, the primary stream ejected through the upper side orifice and the primary stream ejected through the lowerside orifice do not clash each other. A distance between one orifice and the adjacent orifice in both the circumferential and generatrix directions can be the same as that of prior arts. Therefore, according to the present invention, no problem shall be raised in terms of reduction in production capacity and the need for the increase of the height of the peripheral wall.

Figure 3:
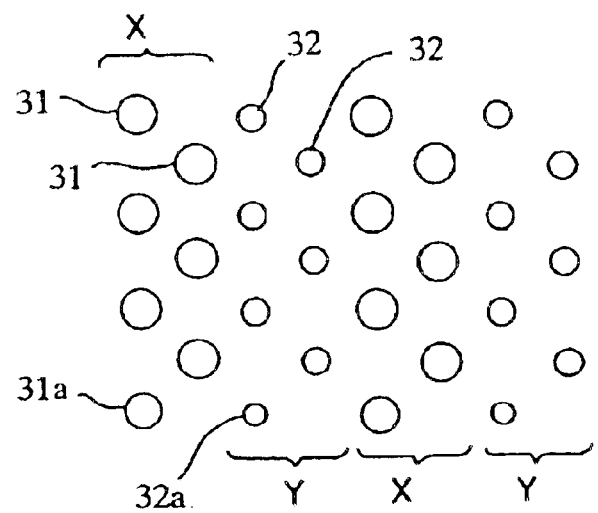
FIG. 3 is an example for another arrangement of orifices.

FIG. 3 shows an example for another arrangement of rows of the orifices provided by perforation in the peripheral wall 2. Each of the odd latitudinal rows, such as the first row, the third row, etc. located from the upper side of the generatrix direction of the outer circumference of the peripheral wall 2, has larger orifices 31 and smaller orifices 32. The corresponding larger orifices 31 in the odd rows are aligned in the same generatrix direction, and the corresponding smaller orifices 32 in the odd rows are also aligned in the same generatrix direction. On the other hand, each of the even latitudinal rows, such as the second row, the fourth row, etc. has larger orifices 31 and smaller orifices 32. Each of the orifices 31 and 32 in even rows are positioned in a middle between an orifice 31 and an orifice 32 in the odd row. Accordingly, the peripheral wall 2 is formed alternately with a longitudinal orifice row group X comprising two rows of the larger orifices 31, and the other longitudinal orifice row group Y comprising two rows of the smaller orifices 32 in the generatrix direction. Diameters of the orifices 31a and 32a positioning at the lowerside of the generatrix direction are smaller than those of orifices 31 and 32 positioning at the upper side of the generatrix direction, like the example shown in FIG. 2. The arrangement of the rows should not be limited to the examples shown in FIG. 2 and FIG. 3, and other various arrangements may be applied to the present invention. In this regard, it is essential that 2 or more types of orifices each having different diameter are provided in the outer circumferential direction of the peripheral wall 2, and that the diameter of the orifice positioning at the lowerside of the generatrix direction is smaller than the diameter of the orifice positioning at the upper side of the generatrix direction.

Figure 5:
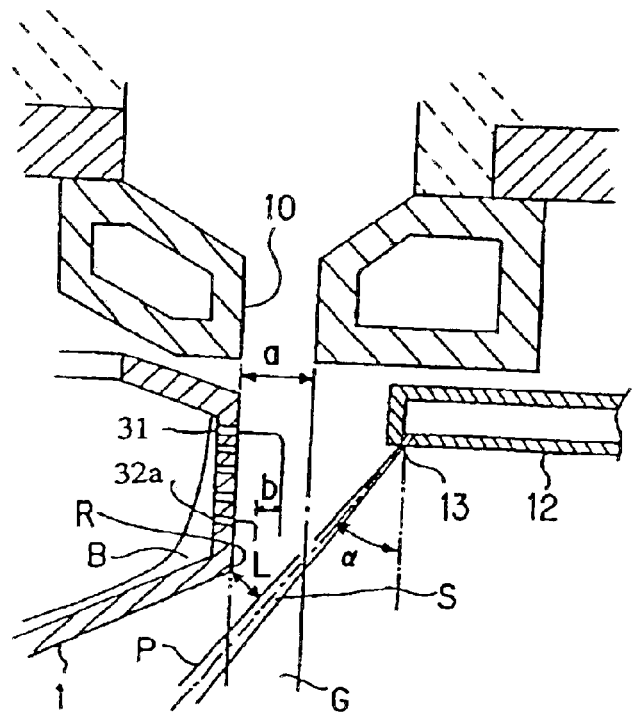
FIG. 5 is a schematic diagram showing an ejection of compressed fluid flow.

Around the peripheral wall 2 of the rotating member 1, flame flow G is ejected from the ejecting outlet 10 located around the rotating member 1 toward a direction in approximately parallel with the generatrix direction of the outer circumference of the peripheral wall 2. The primary stream is introduced into the flame flow G, and is then made into a fine fiber to form a secondary fiber. FIG. 4 is a diagram explaining the process for introducing the primary stream into the flame flow G according to the present invention. In FIG. 5, the primary stream ejected through orifices of latitudinal rows on the upper side and the primary stream ejected through orifices of latitudinal row on the lowerside are introduced into the flame flow G having a width (a), and maintain a certain distance (b) therebetween in the flame flow. Thus, these primary stream can be subjected to be efficiently heated by the flame flow and to be efficiently drawn, so as to be made into fine fibers.

The secondary fibers being made into fine fibers are cut by colliding with compressed fluid ejected through the ejecting outlet 13 of the ejecting nozzle 12. In the illustrated example, the compressed fluid is ejected through the ejecting outlet 13 at high speed as much as 3 kg/cm$^2$ on pressure basis. In this case, the angle of the ejection is preferably about 15–30 degree relative to a flowing direction of the flame flow G. When cutting the secondary fibers by applying the compressed fluid to the secondary fibers, the length of the secondary fibers can be controlled by appropriately selecting the angle to eject the compressed fluid and ejecting pressure.

In the collision or impact of the secondary fiber and the compressed fluid, it is required that a temperature at a bottom edge R of the peripheral wall 2 is not lowered due to the ejecting flow S of the compressed fluid, and that the bottom edge R of the peripheral wall 2 does not affect the performance to make the secondary fibers finer. Thus, a distance L between the bottom edge R of the peripheral wall 2 and a top edge P of the compressed fluid S should be about 30–50 mm or more, so as to prevent the top edge P of the compressed fluid S to the bottom edge R of the peripheral wall 2 of the rotating member 1. Thus, the lowering of the temperature at the bottom edge of the peripheral wall 2 due to collision by the compressed fluid flow S may be prevented.

According to the present invention, the angle α of the ejecting direction of the compressed fluid is about 15–30 degree, and the distance L between the bottom edge R of the peripheral wall 2 and the top edge P of the compressed fluid S is at least about 30–50 mm. Therefore, the temperature of the peripheral wall 2 does not decrease. In addition, since the ejecting flow S collides with the flame flow G after the primary stream is fined, it does not affect the formation of fine fibers, so as to continuously produce the secondary fibers with appropriate fiber length.

The preferable fiber length can be obtained by controlling the ejected force of the compressed fluid. Generally, it is preferable to control or adjust the fiber length longer in case of low density product to which restoring property from compressed state is required, and it is preferable to control or adjust the fiber length shorter in case of medium-high density product to which hardness and rigidity is required.

When the rotating member 1 has the diameter of is 400 mm, it is preferable to provide 20–30 ejecting nozzles 12 in the apparatus. If less than 20 of the ejecting nozzles 12 is provided, the fiber length tends to be unfavorably longer. When more than 30 of the ejecting nozzles 12 are provided, no remarkable effect to obtain shorter fibers is given, but consumption of the compressed fluid is increased to thereby make the production cost unfavorably high. The ejecting outlet 13 to be used is provided in slot-shaped, of which shorter side length is 0.4–1.0 mm and the longer side length is 7–15 mm, and preferably the one having the dimension of 0.5 mm×10 mm. If the size of the slot-shaped ejecting nozzle is smaller than the one as described above, the fiber length tends to be unfavorably longer. When the size of a the ejecting nozzles is larger than the one as described above, no remarkable effect may be obtained, but consumption of the compressed fluid is increased to thereby make the production cost unfavorably high.

According to the process specified in the present invention, glass fibers were produced by using standard glass and hard glass as the material, respectively, under the condition as specified in Table 1. For example, For producing glass fibers by using standard glass, the diameter of the larger orifice 31 was 0.9 mm, the diameter of the smaller orifice 32 was 0.75 mm, the diameter of the larger orifice 31a was 0.8 mm, and the diameter of the smaller orifice 32a was 0.7 mm. Six latitudinal rows comprising the larger orifices 31 and the smaller orifices 32 were formed, while 40 latitudinal rows comprising the larger orifices 31a and the smaller orifices 32a were provided. Although the diameter of the orifices provided on the upper side and the diameter of the orifices provided on the lowerside are altered to be smaller step by step in this example, the present invention includes an embodiment in which the diameters of the orifices gradually become smaller from the upper side to the lowerside.

For comparison, glass fibers were prepared according to the conventional process under the condition described in Table 1 by using standard glass and hard glass as the material, respectively.

Figure 6:
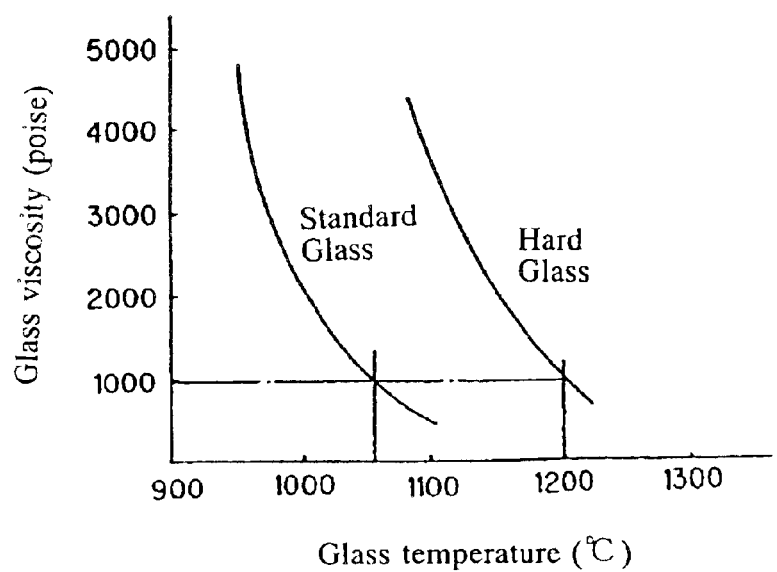
FIG. 6 is a chart showing a relationship between glass temperature and viscosity.

"Standard glass" is defined as boric acid-containing ($B_2O_3$) glass or boric acid-free glass, which has a viscosity of approximately 1,000 poise at 1,070° C. as shown in FIG. 6. "Hard glass" is defined as boric acid-containing ($B_2O_3$)

glass or boric acid-free glass, which has a viscosity of approximately 1,000 poise at 1,200°.

A low density glass fiber molding having the dimension of 10 Kg/m$^3$×50 mm×430 mm×1370 mm (which may be used for an insulating article) was produced by molding the glass fibers obtained as described above. Further, the restoring rate of said insulating article was measured. The restoring rate was measured as follows. The insulating article was compressed to 87% in a volume, and was maintained in the compressed state for a month. The compression was released, and after 4 hours a thickness of the insulating article was measured. A ratio of the measured thickness relative to a required thickness (50 mm) was obtained to obtain the restoring rate.

TABLE 1

| Low Density Product | Standard Glass | | Hard Glass | |
|---|---|---|---|---|
| | Present invention | Prior Art | Present invention | Prior Art |
| Spinning Amount (Kg/Hr) | 400 | 400 | 400 | 400 |
| Height of peripheral wall (mm) | 71 | 58 | 71 | 58 |
| Fuel Gas Amount (m$^3$/Hr) | 14 | 17 | 14 | 17 |
| Average Fiber Diameter (μm) | 6.5 | 7.0 | 7.5 | 7.5 |
| Restoring rate against Compression (%) | 115 | 110 | 110 | 105 |
| Energy Index (Fuel gas amount/Spinning amount: m$^3$/ton) | 35 | 42.5 | 35 | 42.5 |
| Ejection Pressure of Ejecting Nozzl (Kg/cm$^2$) | 1.5 | 0 | 2.0 | 0 |
| Fiber Length | Somewhat short | Long | Somewhat short | Long |
| Orifice Arrangement | ○ o ○ o ○<br>○ o ○<br>○ o ○ o ○<br>○ o ○<br>○ o ○ o ○<br>(Orifice Arrangement in FIG.3) | ○ ○ ○ ○ ○<br>○ ○ ○ ○ ○<br>○ ○ ○ ○ ○<br>○ ○ ○ ○ ○<br>○ ○ ○ ○ ○ | ○ o ○ o ○<br>○ o ○<br>○ o ○ o ○<br>○ o ○<br>○ o ○ o ○<br>(Orifice Arrangement in FIG. 3) | ○ ○ ○ ○ ○<br>○ ○ ○ ○ ○<br>○ ○ ○ ○ ○<br>○ ○ ○ ○ ○<br>○ ○ ○ ○ ○ |
| | Upper 6 Rows Larger orifice diameter: 0.9 mm Smaller orifice diameter: 0.75 mm | Upper 6 Rows 0.9 mm | Upper 6 Rows Larger orifice diameter 0.85 mm Smaller orifice diameter: 0.85 mm | Upper 6 Rows 1.0 mm |
| | Remaining 40 Rows Larger orifice diameter: 0.8 mm Smaller orifice diameter: 0.7 mm | Remaining 31 Rows 0.8 mm | Remaining 40 Rows Larger orifice diameter: 0.9 mm Smaller orifice diameter: 0.8 mm | Remaining 31 Rows 0.9 mm |

As can be seen from Table 1 shown above, the consumption of fuel when using the equivalent amount of glass fibers in the present invention is less than that in the prior art. In the present invention, the compressed fluid is ejected from the ejecting nozzle 12 to collide it to the secondary fibers. At this stage, the secondary fibers are not knotted or entangled with each other and are distributed, because the length of the obtained fibers according to the present invention are shorter than those obtained by the prior art. In the example of the present invention, the ejection pressure of the ejecting nozzle was 1.5 kg/cm$^2$ for standard glass and 2.0 kg/cm$^2$ for hard glass, because voscocity of glass was considered.

The difference in diameter between the larger orifice 31 and the smaller 6, orifice 32 both provided in the peripheral wall 2 of the rotating member 1 is fixed to a range of from 0.02 to 0.3 mm (including the case further larger or shorter orifices are provided). When the difference is less than 0.02 mm, there is no substantial a difference in the length of the primary stream to be ejected. When the difference exceeds 0.3 mm, the difference in the spinning amount between the larger orifice and the smaller orifice becomes too big, because the spinning amount (g/orifice/Hr) through one orifice increases relative to the value obtained by raising the orifice diameter to 4th power, and therefore, it is not possible to produce glass fibers with good quality under the same condition (such as condition as to drawing burner, hollow rotating member, molten glass, ejecting nozzle, etc.). From the reason described above, the difference in the diameter between at least two different types of orifices each having different diameter is fixed to a range of from 0.02 to 0.3 mm. In the example described above, the diameter of the larger orifices arranged in the upper region is fixed to 0.9 mm, while the diameter of the smaller orifices arranged in the upper region is fixed to 0.75 mm, and the difference in these diameters is 0.15 mm, in case of the standard glass.

According to the present invention, glass fibers were prepared under the condition described in Table 2 by using standard glass and hard glass as the material, respectively. For comparison, according to the conventional invention, glass fibers were also prepared under the condition described in Table 2 by using standard glass and hard glass as the material, respectively. These standard glass and hard glass are the same ones as used in the example (and comparative example) conditioned in Table 1.

Medium-high density glass fiber moldings having the dimensions of 32 Kg/m$^3$×50 mm×605 mm×910 mm and 96 Kg/m$^3$×50 mm×605 mm×910 mm (which are used as an insulating article) were produced by molding the glass fibers obtained as described above. Also, each of the thus obtained insulating articles was compressed so as to be reduced to the 50% by volume to measure the compressive strength thereof.

TABLE 2

| Middle-high Density Product | Standard Glass | | Hard Glass | |
|---|---|---|---|---|
| | Present invention | Prior Art | Present invention | Prior Art |
| Spinning Amount (Kg/Hr) | 400 | 400 | 400 | 400 |
| Height of peripheral wall (mm) | 71 | 58 | 71 | 58 |
| Fuel Gas Amount (m$^3$/Hr) | 14 | 17 | 14 | 17 |

TABLE 2-continued

| Middle-high Density Product | Standard Glass | | Hard Glass | |
|---|---|---|---|---|
| | Present invention | Prior Art | Present invention | Prior Art |
| Average Fiber Diameter ($\mu$m) | 6.5 | 7.0 | 7.5 | 7.5 |
| Compressive Strength at 50% Compression (Kg/m$^3$) | | | | |
| 32 kg/m$^3$ Fiber | 1200 | 800 | 1100 | 700 |
| 96 kg/m$^3$ Fiber | 10100 | 8500 | 9500 | 7900 |
| Energy Index (Fuel gas amount/Spinning amount: m$^3$/ton) | 35 | 42.5 | 35 | 42.5 |
| Ejection Pressure of Ejecting Nozzle (Kg/cm$^2$) | 2.2 | 0 | 2.8 | 0 |
| Fiber length | Short | Long | Short | Long |
| Orifice Arrangement | ○ o ○ o<br>○ o ○ o<br>o ○ o ○<br>o ○ o<br>(Orifice Arrangement in FIG. 2)<br>Upper 6 Rows Larger orifice diameter 1.0 mm<br>Shorter orifice diameter 0.75 mm<br>Remaining 40 Rows Larger orifice diameter 0.95 mm<br>Shorter orifice diameter 0.7 mm | o o o o o<br>o o o o o<br>o o o o o<br>o o o o o<br><br>Upper 6 Rows 0.9 mm<br><br><br><br>Remaining 31 Rows 0.8 mm | ○ o ○ o<br>○ o ○ o<br>o ○ o ○<br>o ○ o<br>(Orifice Arrangement in FIG. 2)<br>Upper 6 Rows Larger orifice diameter 1.1 mm<br>Shorter orifice diameter 0.85 mm<br>Remaining 40 Rows Larger orifice diameter 1.05 mm<br>Shorter orifice diameter 0.8 mm | o o o o o<br>o o o o o<br>o o o o o<br>o o o o o<br><br>Upper 6 Rows 1.0 mm<br><br><br><br>Remaining 31 Rows 0.9 mm |

As can be seen from Table 2 shown above, it may be understood that the process of the present invention allows to produce glass fibers with less fuel consumption for the equivalent production in quantity, and can improve the compressive strength of the obtained glass fiber molding when compared with the product produced according to the process of the prior art, and thereby, glass fibers capable of complying with quality requirement for medium-high glass fiber moldings can be obtained by the present invention.

Figure 7:
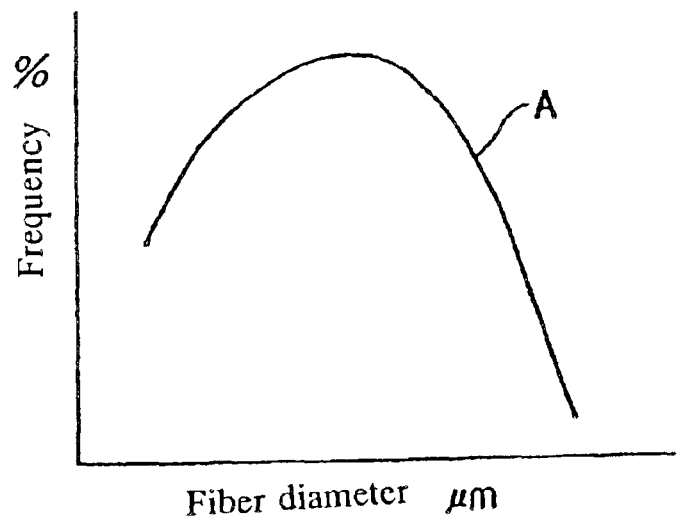
FIG. 7(a) is a chart showing a fiber diameter distribution of low density product.
FIG. 7(b) is a chart showing a fiber diameter distribution of medium-high density product.
Figure 7:
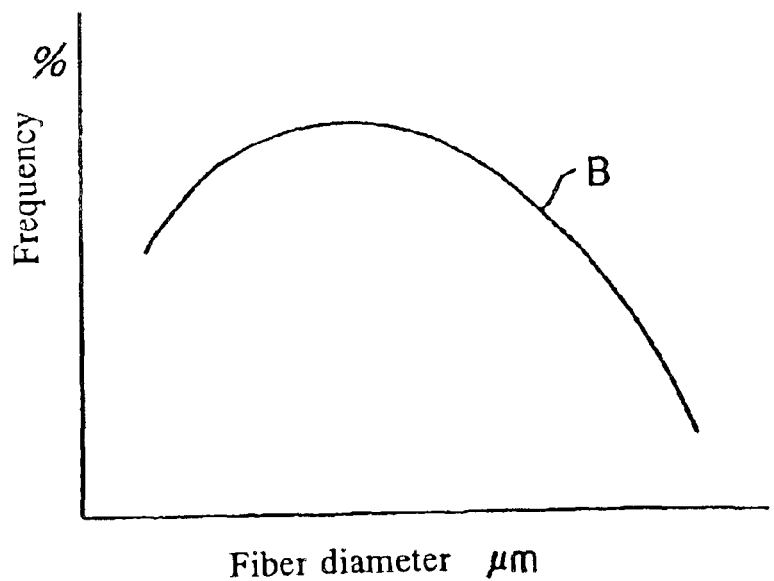

For producing the low density glass fiber moldings, it is required to reduce the distribution of fiber diameters for ensuring good restoring property against compression. FIG. 7(a) shows the fiber diameter distribution A of the low density glass fiber moldings obtained by the process of the present invention, to which the restoring property against compression is required. The fiber diameter distribution A required for the low density glass fiber moldings obtained by the process of the present invention is relatively narrow. FIG. 7(b) shows the fiber diameter distribution B of the medium-high density product obtained by the process of the present invention, to which hardness and rigidity are required, and the fiber diameter distribution B is wider than the fiber diameter distribution A of the low density product. Therefore, according to the process of the present invention, glass fibers having the fiber diameter distribution capable of complying with quality requirements for either of the low density products or the medium-high density products can be obtained.

As described above, according to the present invention, at least two types of orifices each having different diameter are provided in the peripheral wall of the rotating member alternately, and the primary stream of molten glass is ejected through the orifices by centrifugal force, thereby allowing to form the fined secondary fibers of glass by introducing the primary stream into the flame flow. The primary stream is fined into the secondary fibers, which can have a desired length by colliding the secondary fibers with the compressed fluid from a direction at an acute angle. It is possible to easily obtain glass fibers with good quality capable of complying with various quality requirements, such as fiber diameter, fiber diameter distribution and fiber length, irrespective of the use for the low density product or the medium-high density product. In addition, the process of the present invention has further advantages of improving the production efficiency, reducing the fuel consumption for the drawing burner and thereby reducing the production cost.

Further, the apparatus according to the present invention allows to increase the production of the secondary fibers with good quality by preventing the collision of fibers at, the time of drawing into fine fibers by means of alternately providing at least two types of orifices each having a different diameter in the circumferential direction of the peripheral wall of the rotating member. Also, it is possible to operate the processes from the primary stream to the secondary fibers continuously by a preventing to cause collision of the compressed fluid flow at the time of fining fibers by means of ejecting the compressed fluid from a direction at an acute angle against the flowing direction of the flame flow.

What is claimed is:

1. A process for producing glass fiber comprising:
    heating and rotating a hollow cylinder-shaped rotating member having a peripheral wall provided with orifices so as to rotate molten glass in the rotating member, and ejecting the molten glass through the orifices by centrifugal force to form glass fiber, characterized in
    ejecting the molten glass through a larger orifice and a smaller orifice arranged alternately in a circumferential direction of the rotating member in the peripheral wall, so as to form two types of primary streams having different length,
    introducing said primary streams into a flame flow around the rotating member, said flame flow being ejected in a direction substantially parallel with a generatrix direction of an outer circumference of the peripheral wall, so as to fine said primary streams to form secondary fibers, and
    ejecting compressed fluid in a direction at an acute angle relative to the flame flow including secondary fibers, to collide the secondary fibers with the compressed fluid so as to cut the secondary fibers to control a length of the secondary fibers.

2. The process for producing glass fiber according to claim 1, wherein the compressed fluid is ejected in an angle of 15–30 degree relative to the generatrix direction of the outer circumference of the peripheral wall of the rotating member.

3. The process for producing glass fiber according to claim 1, wherein a distance between a top edge of the compressed fluid and a bottom edge of the peripheral wall of the rotating member is at least 30 mm.

4. An apparatus for producing glass fiber comprising:

a hollow cylinder-shaped rotating member having a peripheral wall alternately provided with a larger orifice and a smaller orifice in a circumferential direction of the peripheral wall, a circular drawing burner concentrically arranged above and around the rotating member, and having an ejecting outlet opened in a direction substantially parallel with a generatrix direction of an outer circumference of the peripheral wall, and an ejecting nozzle around the drawing burner, said ejecting nozzle being concentrically arranged above and around the peripheral wall of the rotating member, and having an ejecting outlet opened in a direction at an acute angle relative to the generatrix direction of the outer circumference of the peripheral wall, wherein said peripheral wall has an upper side region and a lower side region, wherein said upper side region is alternately provided with the larger orifice having a first diameter and the smaller orifice having a second diameter in the circumferential direction, wherein said lower side region is alternately provided with the larger orifice having a third diameter and the smaller orifice having a fourth diameter in the circumferential direction, wherein said third diameter is smaller than said first diameter, and wherein said fourth diameter is smaller than said second diameter.

5. The apparatus for producing glass fiber according to claim 4, wherein:

the larger orifices are arranged in the generatrix direction of the outer circumference to form first bands group of orifices, the smaller orifices are arranged in the generatrix direction of the outer circumference to form second bands group of orifices, and the first bands group of orifices and the second bands group of orifices are arranged alternately in the circumferential direction of the peripheral wall of the rotating member.

6. The apparatus for producing glass fiber according to claim 4, wherein a difference in the diameter between at least two types of orifices each having different diameter is in a range of from 0.02 to 0.3 mm.

7. The apparatus for producing glass fiber according to claim 5, wherein a difference in the diameter between at least two types of orifices each having different diameter is in a range of from 0.02 to 0.3 mm.

8. The apparatus for producing glass fiber according to claim 4, wherein the first diameter >the second diameter >the third diameter >the fourth diameter.

9. A process for producing glass fiber comprising:

heating and rotating a hollow cylinder-shaped rotating member having a peripheral wall provided with orifices so as to rotate molten glass in the rotating member, and ejecting the molten glass through orifices by centrifugal force to form glass fiber, characterized in ejecting molten glass through a larger orifice and a smaller orifice arranged alternately in a circumferential direction of the rotating member in the peripheral wall, so as to form two types of primary streams having different length, introducing said primary streams into flame flow around the rotating member, said flame flow being ejected in a direction substantially parallel with a generatrix direction of an outer circumference of the peripheral wall, so as to fine said primary streams to form secondary fibers, and ejecting compressed fluid in an angle of 15–30 degree relative to the generatrix direction of the outer circumference of the peripheral wall of the rotating member, to the flame flow including secondary fibers, to collide the secondary fibers with the compressed fluid, so as to cut the secondary fibers to control a length of the secondary fibers, wherein a distance between a top edge of the compressed fluid and a bottom edge of the peripheral wall of the rotating member is 30–50 mm.

* * * * *